United States Patent Office 2,694,728
Patented Nov. 16, 1954

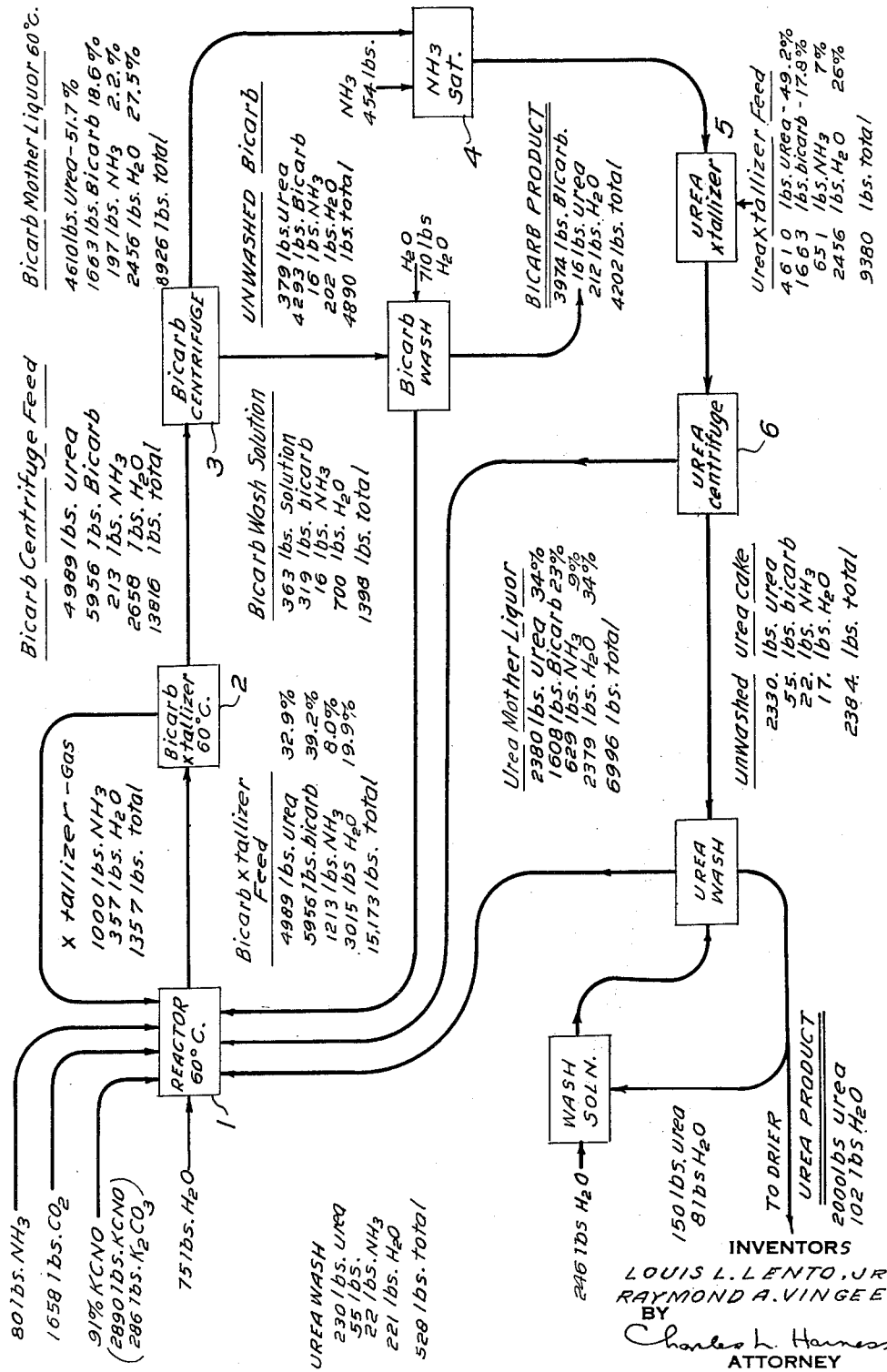

2,694,728

METHOD OF PREPARING UREA

Louis Leonard Lento, Jr., Springdale, and Raymond Arthur Vingee, Stamford, Conn., assignors to American Cyanamid Company, New York, N. Y., a corporation of Maine Application July 11, 1952, Serial No. 298,338

6 Claims. (Cl. 260—555)

The present invention relates to the synthesis of urea. More particularly the invention is concerned with the reaction of an alkali metal cyanate with ammonium bicarbonate or ammonium carbonate in water to form urea and alkali metal bicarbonate. In a more particular embodiment, the invention is directed to an improvement in the reaction of an alkali metal cyanate with ammonia and carbon dioxide in water solution to form urea by the so-called Bucher process of U. S. Patent 1,241,919.

Accordingly, it is an object of the invention to prepare urea together with byproduct alkali metal bicarbonate by reacting an alkali metal cyanate with an ammonium carbonate (or ammonia with carbon dioxide) in water to provide unusually high yields of urea. It is a further object of the invention to conduct the Bucher reaction in such a way that hydrolysis of the alkali metal cyanate reactant is markedly reduced. It is another object of the invention to subject cyanate ions to the action of ammonium ions under aqueous conditions that result in high yields of urea. Another object of the invention is to react an alkali metal cyanate with ammonia and carbon dioxide in water to form urea and byproduct alkali metal bicarbonate in readily separable form. A still further object of the invention is to react potassium or sodium cyanate with carbon dioxide and a greater excess of ammonia in water. Another object is to provide an economically feasible method of preparing urea from an alkali metal cyanate. A still further object is to reduce the solubility of potassium or sodium bicarbonate in an aqueous solution of urea. It is also an object to prepare potassium or sodium bicarbonate from the corresponding cyanate in high yield and purity. Additional objects will be apparent from the discussion hereinafter.

At the present time about the only commercial process for making urea is by heating ammonium carbamate under pressure—the so-called Basarov process. Despite the expense attending the use of a high pressure system and the technical difficulties involved in separating the urea from byproduct ammonium carbonate, unreacted ammonium carbamate, and water, the Basarov process is nevertheless so cheap that it has supplanted all previous commercial or semi-commercial methods of making urea, e. g., from cyanamide, cyanates, and the like. Up until the present invention, attempts to improve these older urea sytheses to permit their economic competition with the Basarov synthesis have been unsuccessful. One of the most persistent of such attempts has been directed to the double decomposition reaction of alkali cyanates with ammonium salts, utilizing the well-known Wöhler isomerization of ammonium cyanate to urea, thus:

MCNO + NH₄X ⇌ NH₄CNO + MX

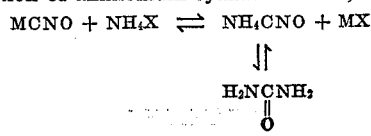

(In the above equation, and hereafter, "M" represents Na or K, and "X" is halide, sulfate, or the like.)

For example, it has long been known that if stoichiometric amounts of NaCNO and (NH₄)₂SO₄ are dissolved in water, and the solution evaporated to dryness, urea can be extracted from the dry mass with methanol in nearly quantitative yield. Despite the simplicity of this process, however, it has never been able to compete with the Basarov process, for the following reasons: (1) as the byproduct sodium salt is not readily reconverted to NaCNO for recycling; (2) the cost of evaporating the aqueous solution to dryness is excessive; and (3) solvent losses in methanol extraction are considerable.

Attempts to overcome these difficulties recognized that, to be commercially successful, any cyanate→urea synthesis would have to (1) utilize an ammonium salt, NH₄X, the anion of which, X, would give an alkali metal salt, MX, readily reconvertible to alkali metal cyanate, MCNO; (2) MX would have to be much less soluble in water than urea, so that solid MX could be separated without resort to evaporation to dryness and methanol extraction; and (3) after separation of the bulk of the MX precipitate, the MX remaining in the urea solution must not crystallize with the urea when the solution is cooled.

One of the most promising attempts at attaining these three goals involved the use of ammonium bicarbonate as the ammonium salt (X=HCO₃⁻), preferably formed in situ by passing the requisite quantities of NH₃ and CO₂ gases into an aqueous solution of alkali metal cyanate. It was established that when reaction was carried out at room temperature, MHCO₃ rapidly precipitated, and could be filtered at this point or left in the reaction slurry. The NH₄⁺ and CNO⁻ in solution then reacted to form urea. Byproduct MHCO₃ was filtered either before or after the maximum urea content was reached. (The MHCO₃ so obtained was readily converted to MCNO in the known way, e. g., by heating to convert to M₂CO₃, followed by fusion of the latter with nitrogenous organic waste matter.) After filtering the MHCO₃ precipitate, the remaining liquor was of course saturated with MHCO₃, and the problem of how to crystallize urea substantially uncontaminated with MHCO₃ from such liquor was thus presented. This was solved by the ingenious expedient of passing a little additional NH₃ into the liquor; this NH₃ increased the solubility of dissolved MHCO₃ sufficiently to keep it in solution when the solution was chilled to crystallize urea. This process (sometimes called the Bucher process) by using (1) an aqueous system throughout; (2) the cheapest possible ammonium salt reactant (NH₃+CO₂); (3) by resulting in a byproduct alkali salt convertible to MCNO; and (4) by its avoidance of organic solvents, solves many of the difficulties of the cyanate→urea synthesis. Against these indubitable advantages, however, must be opposed the objection that the Bucher process gives a poor yield of urea based on MCNO. Various modifications of the Bucher process have been tried in attempting to raise the yield, but prior to the present invention, these have been substantially unsuccessful.

It has long been known that the hydrolysis of CNO⁻ to NH₃ and CO₂ was responsible for the low yield in the Bucher process, and further that the hydrolysis rate increased with increasing CNO⁻ concentration and with increasing temperatures. Thus, as shown by Walker and Hambly, Chem. Soc. J., vol. 67, pp. 746-767 (1895), cyanate ions are fairly resistant to hydrolysis in hot dilute (e. g., decinormal) aqueous solutions but are rapidly hydrolyzed in more concentrated solutions (e. g., ⅓ normal). As the Bucher process necessarily involves cyanate concentrations many times greater than ⅓ normal (in order to permit recovery of the urea by crystallization) cyanate hydrolysis is of course much greater.

The main feature of the present invention is the discovery of a means for effectively reducing CNO⁻ hydrolysis. This means lies in conducting the reaction

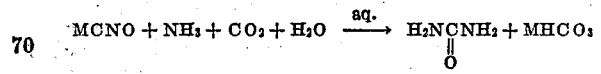

in the presence of a great excess of ammonia, under conditions more precisely stated hereinafter. Not only does such excess ammonia reduce cyanate hydrolysis markedly when properly employed, but also permits a cleaner separation of byproduct MHCO₃ in an unobvious and paradoxical fashion.

It is surprising that excess NH₃ should have any beneficial effect in the synthesis of urea from cyanates.

Walker et al., supra, p. 764, proved that the addition of decinormal $NH_3$ to a solution of decinormal $$NH_4^+ + CNO^-$$

had no effect on the yield of urea. Walker's conclusions as to the lack of effect of $NH_3$ in molar excess in dilute cyanate solutions apply to concentrated cyanate solutions as well. Thus, in using twice the stoichiometric amount of $NH_3$, i. e., a $NH_3:CO_2:NaCNO$ mole ratio 2:1:1, in concentrated aqueous solution, the following results are obtained at 25° C.

| Time, hours | Urea yield, percent of theory |
|---|---|
| 0 | 0 |
| 4 | 11.72 |
| 22 | 36.42 |
| 28 | 42.60 |
| 46 | 49.40 |
| 339 | 53.00 |

While the yields of urea in the above table are a little in excess of those obtainable when using only the calculated amount of $NH_3$, this increase in yield is bought at the disproportionate price of so increasing the solubility of $MHCO_3$ (a phenomenon utilized by Bucher when crystallizing urea free from $MHCO_3$), that separation of $MHCO_3$ from urea by fractional crystallization is rendered impracticable. That is to say, only a minor portion of the $MHCO_3$ precipitates during the reaction when $NH_3$ is in 2-molar excess, and most of the balance comes down with the urea on cooling to recover the urea. Doubling both the $NH_3$ and $CO_2$ was found to give poorer yields of urea than when only the $NH_3$ was doubled. Quadrupling the $NH_3$ at 25° C. was found to give slightly higher yields than when using double the calculated amount, i. e., 41.60% at 22 hours, but at the cost of the desired initial precipitation of $MHCO_3$, with the result that when the solution was cooled, the product that separated was a hopeless mixture of $MHCO_3$, urea, and ammonium carbonates. Increasing the $CO_2$ while holding $NH_3$ and $NaCNO$ at the calculated amounts gave a readily precipitatible $MHCO_3$, but gave a urea yield even lower than Bucher's.

Despite these indications that excess $NH_3$ was detrimental in the Bucher process, it has now been found that the proper use of the proper excess of $NH_3$ increases the urea yield to startling values, while simultaneously permitting a better separation of $MHCO_3$ from urea than was formerly possible.

The invention may be described briefly as follows: MCNO, $NH_3$, and $CO_2$ are reacted in water by the known Bucher procedure. However, instead of the one mole of $NH_3$ requisite to the equation $$MCNO + NH_3 + CO_2 + H_2O \longrightarrow H_2NCNH_2 + MHCO_3$$
$$\phantom{MCNO + NH_3 + CO_2 + H_2O \longrightarrow H_2NC}\|$$
$$\phantom{MCNO + NH_3 + CO_2 + H_2O \longrightarrow H_2NCN}O$$

as taught by Bucher, a much greater amount of $NH_3$ is used, e. g., at least 5 moles/mole MCNO, and preferably 10–12 moles. The $NH_3$ vapor pressure over the reaction liquor at 60° C. using 10–12 moles $NH_3$ is not sufficiently high to require a closed vessel, which is rather surprising. The use of such large excess of $NH_3$ of course completely prevents any substantial precipitation of $MHCO_3$. The clear solution is heated to a temperature in the range of 45°–80° C. for 10 minutes to 4 hours, preferably at 60° C. for about ½–1 hour, whereby urea is formed in a yield of about 90%. Dissolved $NH_3$ is then stripped from the solution under a partial vacuum, causing a greater fraction of the $MHCO_3$ content to precipitate than would have been possible at the same stage in the Bucher process. After the first crop of $MHCO_3$ is filtered, the process is carried out substantially as taught by Bucher, except that the remaining steps of the Bucher procedure, individually taken, can be operated with considerably more efficiency. Thus, as the dissolved $MHCO_3$ is less after the $NH_3$ stripping step and filtration, less $NH_3$ need be added later to hold it in solution while crystallizing urea.

The amount of excess $NH_3$ to be employed to obtain high urea yields may be varied considerably, depending on various factors, discussed below, but in any case at least a 5-molar excess must be present during the entire course of the reaction; as one mole of $NH_3$ will be consumed per mole of cyanate, obviously either 6 moles of $NH_3$ must be added at the start or else additional $NH_3$ must be added as consumed. It is preferred to add it all at the start.

The inventors have found that the following factors determine the amount of $NH_3$ to be used.

(1) The use of a great excess of $NH_3$ does not increase the urea yield unless $CO_2$ (or carbonate) at least equivalent to $M^+$ is also added to the reaction solution.

(2) The addition of $CO_2$ alone (as such or as carbonate), in any amount, to aqueous alkali cyanate containing no added $NH_4^+$ or $NH_3$ catalyzes and/or accelerates $CNO^-$ hydrolysis to carbonate.

(3) The addition of $CO_2$ in any amount to an aqueous solution containing $NH_4^+$ and $CNO^-$ accelerates $CNO^-$ hydrolysis to carbonate while simultaneously accelerating the reaction $NH_4^+ + CNO^- \rightarrow$ urea.

(4) The addition of both $NH_3$ and $CO_2$ to concentrated aqueous alkali cyanate solutions catalyzes and/or accelerates the formation of urea while simultaneously inhibiting the hydrolysis of $CNO^-$ to carbonate provided that the added $CO_2$ (as such or as carbonate ion) is at least approximately stoichiometrically equivalent to initial $CNO^-$, and provided that sufficient $NH_3$ is added to neutralize all the $CO_2$ (as dissolved ammonium carbonate) and still provide at least 5 moles of $NH_3$/mole $CNO^-$.

The use of excess $NH_3$ as herein disclosed is effective at temperatures in the range of about 45°–80° C. Below 45° C. urea formation is too slow to be of practical value; above 80° C. the hydrolysis of $CNO^-$ to carbonate can be prevented only by impractical excesses of $NH_3$. In the range 65°–80° C. the reaction may be carried out in a closed vessel to prevent undue loss of $NH_3$. From the commercial point of view, it appears preferable to conduct the urea synthesis step at about 60° C. At this temperature the hydrolysis of $CNO^-$ to carbonate is slightly greater than at, say, 50° C., but this slight loss is balanced by the fact that the reaction is complete in ½–1 hour at 60° C. as against twice this time at 50° C., thereby in effect doubling the capacity of the reactor at the highest temperature.

The following examples illustrate preferred embodiments of the invention:

EXAMPLE 1

82 parts of potassium cyanate was dissolved in about 100 parts by weight of water at 60° C. Ammonia and $CO_2$ gases were then passed into the solution until a total of 42 parts of $CO_2$ and 136 parts of $NH_3$ had been added. The resultant solution was held at 60° C. for about 45 minutes. The solution was then subjected to a partial vacuum (150 mm. absolute) to remove nearly all the dissolved ammonia. As the ammonia came off (along with about ⅓ its weight of water vapor), potassium bicarbonate began precipitating. Of the 101 parts of potassium bicarbonate formed by the reaction, 79 parts separated as the pure solid, leaving the remainder in solution. The solid potassium bicarbonate was filtered and the filtrate analyzed for urea. The yield of urea was about 90%, which actually is close to theoretical, in view of the known equilibrium between urea and ammonium cyanate in hot water:

$$H_2NCNH_2 \underset{95\%}{\overset{5\%}{\rightleftarrows}} NH_4^+ + CNO^-$$

EXAMPLE 2

This example is illustrative of a preferred embodiment of the invention wherein the process is carried out on a semi-continuous basis. Reference is made to the flow sheet. All parts are by weight.

Step 1

$$KCNO + NH_3 + CO_2 + H_2O \longrightarrow H_2NCNH_2 + KHCO_3$$

Into reactor 1 is charged the following:

| Source | H₂O | NH₃ | KHCO₃ | KCNO | K₂CO₃ | CO₂ | Urea | Total |
|---|---|---|---|---|---|---|---|---|
| Urea Centrifuge | 2,379 | 629 | 1,608 | | | | 2,380 | 6,996 |
| Bicarbonate Washer | 700 | 16 | 319 | | | | 363 | 1,398 |
| Bicarbonate Crystallizer | 357 | 1,000 | | | | | ¹ 1,357 | |
| Urea Washer | 221 | 22 | 55 | | | | 230 | 528 |
| Make-up | 75 | 80 | | ² 2,890 | ² 286 | 1,658 | | 4,989 |
| Totals | 3,732 | 1,747 | 1,982 | 2,890 | 286 | 1,658 | 2,973 | 15,268 |

¹ These vapors are readily condensed by direct discharge into the liquors previously run into reactor 1 from the urea centrifuge and the bicarbonate washer.
² The KCNO used was technical grade, 91% pure, the balance being $K_2CO_3$.

After all the materials are charged, the reactor 1 is brought to about 60° C. and held at this temperature for about 1 hour, after which it is discharged as a clear solution into the bicarbonate crystallizer 2. The thus formed solution analyzes about: 4989 parts urea, 5956 parts bicarbonate, 1213 parts NH₃, and 3,015 parts H₂O. (There is about 0.6% vapor loss in Step 1.)

Step 2

KHCO₃ (in ammoniacal solution) minus NH₃→KHCO₃↓

The liquor from reactor 1 is held at about 60° C. in the bicarbonate crystallizer 2 under a partial vacuum, e. g., 150 mm. absolute, to strip off most of the dissolved NH₃, say about 1000 parts. This vapor NH₃ is accompanied by about 357 parts water vapor, and the vapor mixture is returned to reactor 1 as described in Step 1, supra. The discharge from the bicarbonate crystallizer 2 is a slurry consisting of 4293 parts of KHCO₃ precipitate and 2,658 parts of water containing in solution 1,663 parts of KHCO₃, 4,989 parts of urea, and 213 parts of NH₃.

Step 3

BICARBONATE REMOVAL

The slurry from Step 2 is centrifuged or filtered at about 60° C. to separate the KHCO₃ precipitate. The crude wet cake analyzes about 4,293 parts KHCO₃, 379 parts urea, 16 parts NH₃, and 202 parts H₂O. The crude wet cake is washed with about 710 parts H₂O, and the thus washed cake then analyzes about 3,974 parts KHCO₃, 16 parts urea, and 212 parts H₂O. It is finally dried. The wash liquor analyzes about 363 parts urea, 319 parts KHCO₃, 16 parts NH₃, and 700 parts H₂O; this liquor is returned to Reactor 1 as in Step 1, supra.

Step 4

The liquor from the bicarbonate separator (still at about 60° C.) analyzes about 4,610 parts urea, 1,663 parts KHCO₃, 197 parts NH₃, and 2,456 parts H₂O. This liquor is run into vessel 4 and to it is added sufficient additional NH₃ to maintain the KHCO₃ in solution when the liquor is subsequently chilled to crystallize urea. Accordingly to the liquor is added 454 parts of NH₃, and the thus treated liquor is passed into the urea crystallizer 5.

Step 5

The solution from vessel 4 is discharged into urea crystallizer 5. This feed analyzes about 4,610 parts urea, 1,663 parts KHCO₃, 651 parts NH₃, and 2,456 parts H₂O. The urea crystallizer vessel is cooled to a temperature of about 20° C., to crystallize about 2,230 parts of urea. The resultant slurry is pumped to urea separator 6.

Step 6

The slurry from step 5 is centrifuged or filtered in urea separator 6. The crude wet urea cake analyzes about 2,230 parts urea, 55 parts KHCO₃, 22 parts NH₃, and 77 parts H₂O. The mother liquor is a clear solution analyzing about 2,380 parts urea, 1,608 parts KHCO₃, 629 parts NH₃ and 2,379 parts H₂O. This liquor is recycled to reactor 1 for use as described in Step 1, supra.

Step 7

UREA WASH

The crude wet urea cake is washed with a solution of 150 parts of urea in 254 parts H₂O at 20° C. in urea wash vessel 7. This washing step removes substantially all the NH₃ and KHCO₃, leaving as the purified wet cake a product analyzing about 2,150 parts urea and 110 parts H₂O. Of this wet cake, 158 parts (150 urea+8 H₂O) can be dissolved in 246 parts H₂O to make up the wash solution for Step 7. The net wet product is thus 2000 parts urea containing about 102 parts H₂O. This wet urea can be dried by methods well known in the art.

The wash liquor from urea wash vessel 7 analyzes about 230 parts urea, 55 parts KHCO₃, 22 parts NH₃, and 221 parts H₂O. This liquor is recycled to reactor 1 for reuse in Step 1.

Calculated on the KCNO consumed (2,890 parts) the urea yield of 2000 parts is 88%. However, as shown by Walker and Hambly (supra), the equation

$$NH_4^+ + CNO^- \rightarrow urea$$

proceeds only to the extent of 95%. Accordingly, the yield may be considered to be actually 88÷95=93%.

The embodiment of the invention as described in Example 2 can be varied in numerous ways by those skilled in the art, depending on individual operating circumstances. Thus, the solution resulting from Step 1 need not be immediately stripped of ammonia, but may if desired, be retained in reactor 1 as the mother liquor for the further reaction of additional alkali cyanate, ammonia, and carbon dioxide to form more urea and alkali metal bicarbonate. Also, in Step 2, the amount of ammonia to be stripped from the solution may be varied somewhat depending on variations contemplated in the subsequent steps. In general, however, it is desirable to remove as much dissolved NH₃ as possible as quickly as possible, to precipitate the maximum amount of KHCO₃. As a practical matter it is generally not worthwhile to strip out the last traces of NH₃, because the removal of more than the fraction stated in Example 2 does not result in the precipitation of any considerable additional KHCO₃, and furthermore, the urea is slowly hydrolyzing during the additional time required for such extended NH₃ stripping. Means of ammonia removal, other than vacuum stripping, can be used, e. g., blowing air or inert vapor through the solution.

While the invention has been described with particular reference to specific embodiments, it is to be understood that it is not to be limited thereto but is to be construed broadly and restricted solely by the scope of the appended claims.

We claim:

1. In the reaction of an alkali metal cyanate of the group consisting of sodium cyanate and potassium cyanate with ammonia and carbon dioxide in water to form urea, the improvement that comprises conducting the reaction at 45°–80° C. in the presence of at least 5 moles of dissolved ammonia per mole of cyanate reactant exclusive of the amount of ammonia required to neutralize CO₂, the CO₂ being present in an amount at least equivalent to the alkali metal cyanate.

2. The method according to claim 1 in which, after the reaction to form urea, most of the dissolved ammonia is removed from solution to precipitate most of the by-product alkali metal bicarbonate, and separating the thus precipitated bicarbonate.

3. In the method of making urea that comprises reacting an alkali metal cyanate with at least an equivalent ammonium carbonate in aqueous solution at 45°–80° C. the improvement that comprises conducting the reaction in the presence of at least 5 moles of excess ammonia per mole of alkali metal cyanate.

4. The method according to claim 3 in which most of the excess dissolved ammonia is removed from solution after the reaction, whereby alkali metal bicarbonate is precipitated and separating the said bicarbonate.

5. The method according to claim 3 in which the excess ammonia per mole of cyanate reactant is at least about 10 moles.

6. In the method of making urea by reacting an alkali metal cyanate, ammonia, and an amount of carbon dioxide at least equivalent to the alkali metal cyanate in aqueous solution at about 60° C., the improvement that comprises maintaining in solution during the reaction about 10–12 moles of ammonia per mole of initial cyanate reactant.

References Cited in the file of this patent

UNITED STATES PATENTS

| Number | Name | Date |
|---|---|---|
| 1,221,506 | Bucher | Apr. 3, 1917 |
| 1,241,919 | Bucher | Oct. 2, 1917 |
| 1,241,920 | Bucher | Oct. 2, 1917 |

FOREIGN PATENTS

| Number | Country | Date |
|---|---|---|
| 75,819 | Germany | June 9, 1894 |
| 314,443 | Great Britain | Dec. 29, 1930 |
| 583,504 | Great Britain | Dec. 19, 1946 |

OTHER REFERENCES

Liebig: "Liebig's Annalen," vol. 38 (1841), pp. 108–9.

Walker: "J. Chem. Soc." (London), vol. 67 (1895), pp. 759–65.

Chattaway: "J. Chem. Soc." (London), vol. 101 (1912), pp. 170–3.

Werner: "J. Chem. Soc." (London), vol. 103 (1913), p. 1013.